United States Patent

Sakurai et al.

[11] Patent Number: 5,746,953
[45] Date of Patent: May 5, 1998

[54] CASTING METHOD FOR FORMING A RESIN MOLDING

[75] Inventors: Masashi Sakurai; Masaru Nakanishi; Hiroshi Tamura; Takehiko Kubo; Takashi Nakamura; Tatsuya Fujita, all of Osaka, Japan

[73] Assignee: Nitto Denko Corporation, Osaka, Japan

[21] Appl. No.: 418,129

[22] Filed: Apr. 6, 1995

Related U.S. Application Data

[63] Continuation of Ser. No. 34,468, Mar. 19, 1993, abandoned.

[30] Foreign Application Priority Data

| Mar. 19, 1992 | [JP] | Japan | 4-093811 |
| Nov. 21, 1992 | [JP] | Japan | 4-335391 |
| Feb. 26, 1993 | [JP] | Japan | 5-063205 |

[51] Int. Cl.$^6$ .................. B29C 35/02; B29C 39/06; B29C 39/44
[52] U.S. Cl. .................. 264/40.4; 264/297.5; 264/297.7; 264/297.8
[58] Field of Search .................. 264/297.5, 297.6, 264/297.7, 40.4, 259, 334, 335, 297.8, 297.9

[56] References Cited

U.S. PATENT DOCUMENTS

| 1,693,264 | 11/1928 | Waner | 264/297.8 |
| 3,619,447 | 11/1971 | Kema | |
| 4,957,671 | 9/1990 | Morris | 264/297.6 |
| 4,961,888 | 10/1990 | Brown | 264/297.5 |
| 5,135,685 | 8/1992 | Masuhara et al. | 264/297.7 |
| 5,135,686 | 8/1992 | Masuhara et al. | 264/297.7 |

FOREIGN PATENT DOCUMENTS

| 2088002 | 5/1970 | France. |
| 2573338 | 5/1986 | France. |
| 2158003 | 11/1985 | United Kingdom. |

*Primary Examiner*—Angela Ortiz
*Attorney, Agent, or Firm*—Sughrue, Mion, Zinn, Macpeak & Seas, PLLC

[57] ABSTRACT

It is an object of the invention to provide a casting method for forming a resin molding which is able to cast the resin molding according to an assembly line production system while completely eliminating variations in quality between products. In the casting method according to the present invention, a plurality of metal molds are circulated at a given time difference in the order of a step of casting a hardenable resin composition into a preheated metal mold, a step of heating and hardening the casted resin composition, and a step of releasing the hardened product from the metal mold and assembling the metal mold. There are provided a plurality of heating devices and, while one metal mold in the hardening step is being heated by one of the heating devices, the other metal mold is heated at the above given time difference by the other of the heating devices.

10 Claims, 5 Drawing Sheets

CASTING METHOD FOR FORMING A RESIN MOLDING

This is a Continuation of application Ser. No. 08/034,468 filed Mar. 19, 1993, now abandoned.

BACKGROUND OF THE INVENTION

The present invention relates to a casting method for forming a resin molding for high voltage by use of a hardenable resin such as an epoxy resin and the like.

Conventionally, to form an insulator by use of a hardenable resin such as an epoxy resin or the like, there has been widely used a casting method.

In recent years, due to the enhancement of a transmission voltage to a super high voltage, there has been increased a need for high stabilization of the quality of an insulating spacer or the like which is used to support a porcelain insulator, a porcelain tube or a connecting conductor within GIS.

Conventionally, when casting a resin molding, there has been well known a circulatory flow method in which a material consisting of a resin mixed with a hardener is casted into a preheated metal mold, the metal mold with the material casted therein is delivered to a heating furnace and the resin is hardened, then the hardened product is released from the metal mold, after release of the hardened product, the metal mold is assembled, and the metal mold is again used to preheat a material.

In the above-mentioned circulatory flow method, metal molds corresponding in number to several pieces of products to be casted in one flow are preheated in a preheating furnace, a material consisting of a resin mixed with a hardener is casted into these metal molds, and after completion of casting of the material into all metal molds, the metal molds are all delivered at a time to a heating and hardening furnace.

A hardenable resin for use in the above-mentioned insulating spacer or the like includes a filler such as alumina, silica or the like added thereto and, therefore, in the hardenable resin, before the resin is gelled to a certain viscosity, the filler is inevitably sedimented and is thus segregated.

However, in the above-mentioned conventional casting method, even if the same blend of hardener mixed resin is casted into the several metal molds, because the casting time varies every metal mold and thus the time necessary for delivery to the heating and hardening furnace varies every metal mold, the filler segregation state inevitably varies between the metal molds. This makes it difficult to completely eliminate variations in quality between the resultant products and this it is almost impossible to stabilize the quality to a high degree required for the above-mentioned insulating spacer and the like.

SUMMARY OF THE INVENTION

The invention aims at eliminating the drawbacks found in the above-mentioned conventional casting method. Accordingly, it is an object of the invention to provide a casting method for forming a resin molding which is able to cast a resin molding according to the assembly line production while eliminating variations in quality between the products almost completely.

In achieving the above object, according to the invention, there is provided a casting method for forming a resin molding in which a plurality of forming metal molds are circulated at a predetermined time difference in the order of a step of casting a hardenable resin composition into a preheated forming metal mold, a step of heating and hardening the casted resin, and a step of releasing the hardened product and assembling the forming metal mold, characterized in that there are provided a plurality of heating devices, for example, heating devices each of a sandwich type, and also that while one of the forming metal molds employed in the hardening step is being heated by one of the heating devices, the other of the forming metal molds employed in the hardening step is heated at the above-mentioned predetermined time difference by the other of the heating devices. In addition, the forming metal mold may be supported in a vertical direction during all steps.

According to the invention, the period of time extending from completion of casting of the hardenable resin composition or material to heating of the metal mold for hardening can be made uniform in all the metal molds. Also, if the hardener mixed resin conposition is casted in the same viscosity state into respective metal molds, then there can be eliminated variations in the filler segregation state between the metal molds to thereby prevent variations in quality between the products almost completely.

DETAILED DESCRIPTION OF THE PREFERRED EMBODIMENTS

Description will be given below of an embodiment of a casting method according to the invention with reference to the accompanying drawings.

Figure 1A:
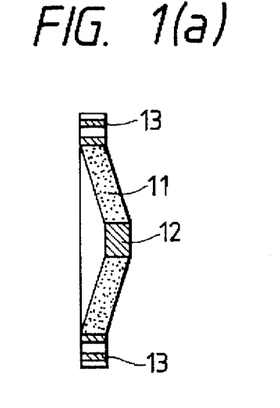
FIG. 1(a) is a section view of an example of a resin molding casted by a casting method according to the invention.

The present invention can be used in casting various kinds of resin moldings, for example, it can be used in casting an insulating spacer as shown in FIG. 1(a) which is used to support a GIS connecting conductor. In FIG. 1(a), reference character 11 designates an epoxy resin molding, 12 stands for a conductor connecting metal member which is embedded in the central portion of the epoxy resin molding, and 13 points out a bolt insertion hole metal member which is embedded at a given distance on the outer peripheral side of the epoxy resin molding 11.

Figure 1B:
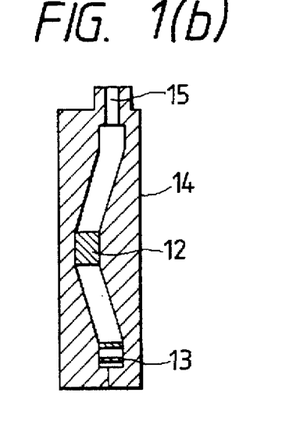
FIG. 1(b) is a section view of a metal mold for casting the above resin molding.

As the forming metal mold for the insulation spacer, for example, as a metal mold 14, as shown in FIG. 1(b), there can be used a metal mold which is split vertically and includes a resin casting port 15 at the top end thereof. In FIG. 1(b), there is shown an assembly state of the metal mold 14 in which the conductor connecting metal member 12, bolt insertion hole metal member 13 and the like are assembled together.

Figure 1C:
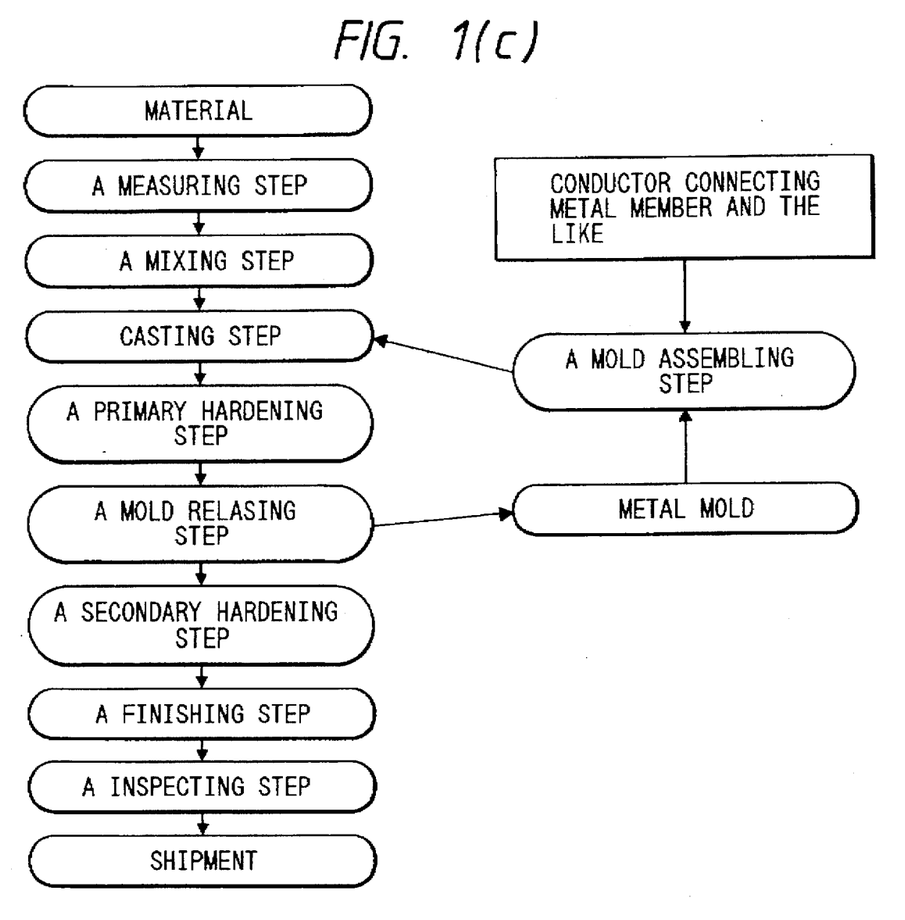
FIG. 1(c) is a flow chart when the above resin molding is manufactured according to the invention.

FIG. 1(c) shows a flow chart when the above-mentioned insulating spacer is manufactured by use of a casting method for forming a resin molding according to the invention.

That is, a material is passed sequentially through a measuring step and a mixing step (a step of mixing the material with a hardener) and is then sent to a casting step. And, a metal mold with the material casted therein is now forwarded to a primary hardening step. After completion of the primary hardening, in a mold releasing step, the metal mold containing the material is separated into the metal mold and a primarily hardened molding. Then, a conductor connecting metal member and the like (including a bolt insertion hold metal member as well) are assembled together with the separated metal mold in a mold assembling step and the assembled metal mold is then sent to the casting step. The above-mentioned operations are performed as one circulation or one cycle and, after then, such circulation flow will be repeated. On the other hand, the primarily hardened molding, which has been released from the metal mold, is then sent to a secondary hardening step, a finishing step and an inspecting step before it is shipped.

Figure 2A:
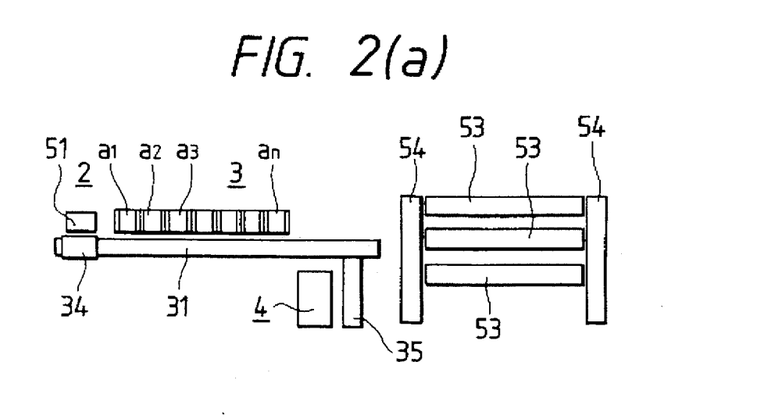
FIG. 2(a) is a plan view of a manufacturing apparatus to be used in the invention.

Now, FIG. 2(a) shows a manufacturing apparatus which is used in the present invention. The apparatus, as shown in FIG. 2(a), comprises devices respectively corresponding to the casting step, primary hardening step, mold releasing step and mold assembling step as well as a device corresponding to the secondary hardening step.

Figure 3:
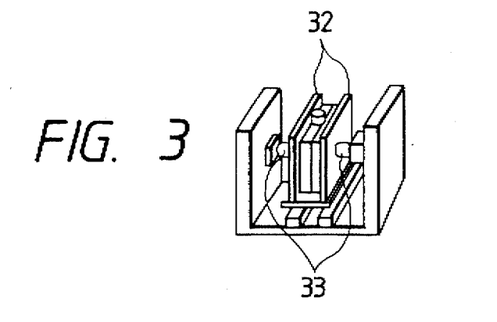
FIG. 3 is a perspective view of an embodiment of a heating device to be used in the invention.

In FIG. 2(a), reference character 2 designates a material casting station which is used to cast a material or a hardener mixed resin into the metal mold. 3 stands for a heating line which includes a plurality of heating devices, preferably, heating devices of a sandwich type $a_1, a_2, \ldots$ on the side of a main rail 31 with one end portion thereof situated on the material casting station 2. For the sandwich type of heating device, as shown in FIG. 3, there can be used a structure in which two heating plates 32 each containing an electric heater therein are disposed opposed to each other and are supported by a piston rod 33. In FIG. 2(a), 34 designates a traverser, 35 stands for an auxiliary rail which is disposed in the other end portion of the main rail 31, and 4 points out a resin releasing and mold assembling station.

The flow of one metal mold in the above production line includes a step of moving an assembled and preheated metal mold to the material casting station 2 by use of the traverser 34 and casting the material into the metal mold, a step of moving the material casted metal mold to a predetermined sandwich type heating device by use of the traverser 34 and holding the metal mold by and between the two heating plates 32 for a predetermined period of time to harden the material (this hardening treatment aims at providing the material with such mechanical strength as allows the material to escape from the metal mold, and this is a so called primary hardening and this primary hardening will be hereinafter referred to as simply hardening), a step of moving the metal mold, in which the hardening of the material is completed (which will be hereinafter referred to as the hardening completed metal mold) to the resin releasing and mold assembling station 4 by use of the traverser 34, and a step of releasing the hardened resin/product from the metal mold and then assembling the resin-released metal mold, and other steps.

Figure 2B:
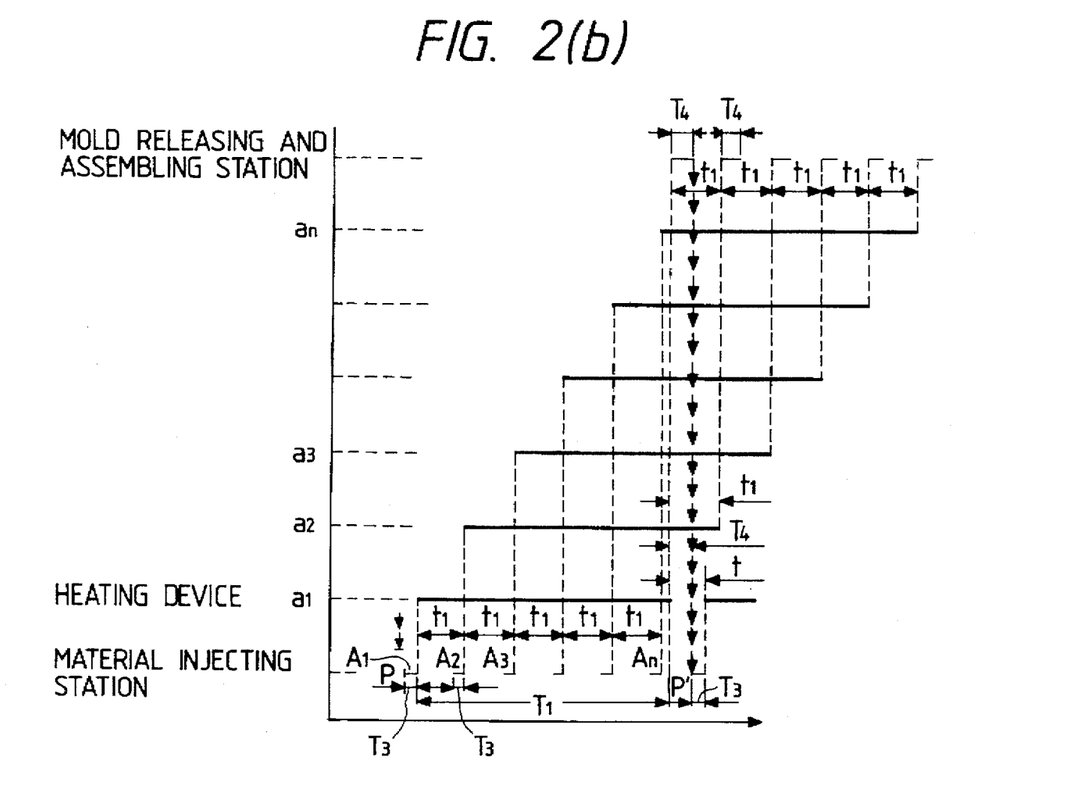
FIG. 2(b) is a time chart which shows the moving states of a metal mold when the resin molding is casted according to the invention by use of the manufacturing apparatus shown in FIG. 2(a)

FIG. 2(b) is a time chart which shows the moving states of a metal mold when a resin molding is casted according to the invention by use of the above-mentioned manufacturing apparatus. The transverse axis of the flow chart shows an elapsed time.

In FIG. 2(b), the movement line of a metal mold $A_1$ shows that the material is casted for a given time $T_3$ in the material casting station, after casting of the material, the metal mold is sent into a heating device $a_1$ and is hardened primarily for a given time $T_1$, and after the primary hardening, the metal mold is forwarded to the mold releasing and assembling station where the material is released from the metal mold and the material released metal mold is then assembled again in a given time $T_4$.

The movement lines of metal molds $A_2, \ldots A_n$ respectively show the same meaning as that of the metal mold $A_1$, except for a time lag $t_1$. The time $T_1$ necessary for the primary hardening is much longer than the time $T_3$ necessary for casting of the material and the time $T_4$ required for the mold releasing and assembling.

In FIG. 2(b), the time necessary for the metal mold to reach a given heating metal mold from the material casting station, the time for the metal mold to reach the mold releasing and assembling station from a given heating device, and the time necessary for the metal mold to reach the material casting station from the mold releasing and assembling station are ignored here, because they are very much shorter than the times $T_1$, $T_3$, $T_4$ and the like.

To cast a resin according to the present invention, as shown in FIG. 2(b), after the material is casted into the metal molds $A_1, A_2, \ldots$ in the material casting station, the metal molds $A_1, A_2, \ldots$ may be sent into the heating line sequentially with a given time lag $t_1$. As can be understood from FIG. 2(b) as well, a time lag required to send the metal mold from the heating line to the mold releasing and assembling station also provides $t_1$ in order to balance the metal mold movements with each other.

Now, when sending the metal mold $A_2$ into the heating line, the metal mold $A_1$ stays still in the heating device $a_1$ and, therefore, there is necessary another heating device $a_2$ which is used to receive the metal mold $A_1$ sent into the heating line. And, when sending the metal mold $A_3$ into the heating line, the metal molds $A_1$ and $A_2$ stay still in the heating devices $a_1$ and $a_1$ respectively and, therefore, there is necessary another heating device $a_3$ used to receive the metal mold $A_3$. Similarly, when sending the metal mold $A_n$ into the heating line, the metal molds $A_1, \ldots, A_{n-1}$ stay still in the heating devices $a_1, \ldots, a_{n-1}$, respectively and, therefore, there is necessary another heating device $a_n$ to receive the metal mold $A_n$ that is sent into the heating line. In other words, the number of metal molds required is n which satisfies an equation, $n-1 < T_1/t_1 < n$ (n is an integer).

When the heating device $a_1$ completes the primary hardening of the resin contained in the metal mold $A_1$, in FIG. 1(b), as shown by arrows, the metal mold $A_1$ is forwarded to the mold releasing and assembling station, in which the primarily hardened resin/product is released from the metal mold and the resin released metal mold is then assembled, and the assembled metal mold is further sent to the material casting station in which a new material or resin composition is casted into the metal mold. After then, the metal mold with the material or resin contained therein is again sent into the heating line.

In this case, if the time t ($t=T_3+T_4$), which is necessary for the metal mold $A_1$ escaped from the heating device $a_1$ to be sent again into the heating line again, is shorter than the time lag $t_1$ ($t_1 \geq T_3+T_4$), then only the heating device $a_1$ is empty when the metal mole $A_1$ is put into the heating line and the metal mold $A_2$ still stays in the heating device $a_2$ which is situated so as to be emptied next to the heating device $a_1$. Therefore, the metal mold $A_1$ is sent into the heating device $a_1$.

As can be clearly understood from FIG. 2(b), a time p', where the metal mold $A_1$ is put into the heating device $a_1$ again, is a time which has elapsed one circulation or one cycle after a time p at which the metal mold $A_1$ has been sent into the heating device $a_1$ previously. After then, this cycle will be repeated.

As can be seen from the foregoing description, after the metal mold $A_n$ is put into the heating device $a_n$, if the time $T_1$ has elapsed, then the heating device $a_n$ becomes empty for a period of time t. However, if it is necessary to preheat the metal mold after the metal mold has been separated and assembled again, then the preheating treatment can be executed by use of the empty time t. In this instance, if the preheating treatment time is expressed as $T_2$, then the following condition must be satisfied: $t_1 \geq T_2+T_3+T_4$.

Among the above-mentioned times, the metal mold heating time $T_1$ may be set according to the sizes of the moldings, the hardening properties of the compositions of the resins and the like and, normally, the standard time $T_1$ may be in the range of 5 to 6 hours.

In the case of a standard molding, with the mold heating time $T_1$=5 hr. 30 min., the time $t_1$ is set for 1 hr., $T_3$ is set for 15 min., and $T_4$ is set for 30 min., respectively; and, if a preheating treatment is necessary, then the time $t_1$ is set for 1 hr., $T_2$ is set for 10 min., $T_3$ is set for 15 min., and $T_4$ is set for 30 min., respectively.

In the above-mentioned case, the shortest time that can be set as the time lag $t_1$ is a longer one of the time $T_3$ necessary for casting of the material and the time $T_4$ necessary for separating and assembling the metal mold. When the time lag $t_1$ is set for the shortest time, then in FIG. 2(b), the time t ($t=T_3+T_4$), which is required to escape the metal mold $A_1$ and send it again into the heating line, is longer than the time lag $t_1$. However, in this case as well, in order to eliminate the possibility that the flow or movement of the metal mold may be confused, the metal mold $A_1$ sent again into the heating line is put into the heating device $a_1$ similarly to the above-mentioned case.

In the use of the present invention, the above-mentioned time $T_1$ may vary according to the sizes and shapes of the metal molds, and the hardening properties of the resins.

To cast resin moldings of various kinds and sizes in accordance with the invention, the largest number of heating devices may be set according to the longest time $T_1$ corresponding to the largest kinds and sizes of resin moldings. That is, when casting the relatively smaller kinds and sizes of resin moldings, the required number of heating devices may be selected and used out of the largest number of heating devices.

In the manufacturing apparatus shown in FIG. 2(b), a number, $T_1/t_1$, of heating devices each of a sandwich type are used for the number, $T_1/t_1$, of metal molds.

The manufacturing apparatus used in the invention is not limited to the illustrated one but the number of heating devices of a sandwich type can be set greater than the metal molds to be used so that they can be used as reserves. Also, the heating devices each of a sandwich type can also be arranged on the two sides of the main rail 31.

In the above-mentioned embodiment, the temperature rise velocity of the resin contained within the metal mold heated by the heating device depends upon: 1) The quantity of heat (q) generated per unit time by a heating device; 2) The thermal capacity (c) of the material to be heated; 3) The heat radiation resistance (r) of the material to be heated; and 4) The heating time.

If the thermal capacity c of a molding becomes greater (or smaller) than that of the standard molding due to the difference in shape or in size, then the quantity of heat q generated per unit time by the heating device may be made greater (or smaller) (in a conductive heat radiation system, a conduction current is made greater or smaller) to thereby keep constant the temperature rise velocity, so that the material or resin composition can be hardened primarily while the metal mold heating time $T_3$ remains the same as the above-mentioned standard time.

Also, when the resin differs in the compositions thereof, then the quantity of heat q generated per unit time by the heating device may be adjusted to thereby control the metal mold heating temperature or heating time $T_3$ or control both of them, so that the primary hardening condition can be controlled.

In the above-mentioned embodiment, the idle time of the heating device is a time ($T_3+T_4$) with respect to the time $T_1$ during which the heating device is used for heating, and a rate of use $T_1/(T_1+T_3+T_4)$ is 88% in the case of the above-mentioned standard molding, which means that the heating device can be used with a very high efficiency. Thus, in a range which can maintain the rate of use of the heating device at a sufficiently high level, the idle times of the respective heating devices can be adjusted to thereby change the heating times of the respective metal molds, so that moldings differing in the primary hardening times from each other (moldings respectively differing in the resin composition, size or shape from each other) can also be produced in one flow or in one cycle.

Figure 4:
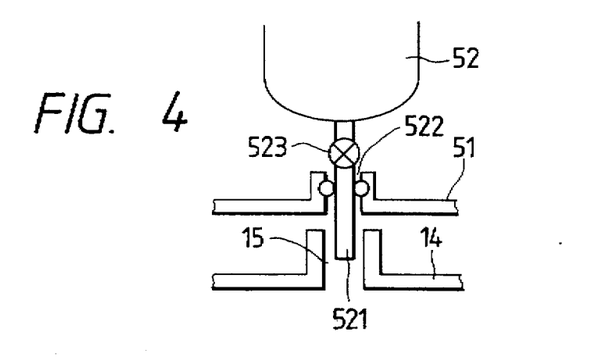
FIG. 4 is an explanatory view to show how to cast a material into a metal mold according to the invention.

According to the invention, it is desirable that a vacuum chamber is used to cast the material into the metal mold. Such material casting state is shown in FIG. 4. In particular, the metal mold 14, which is assembled in the above-mentioned manner, is stored with a vacuum chamber 51 from a door provided on the side portion of the vacuum chamber 51, a lower end nozzle 521 of a mixing kiln 52 disposed just above the vacuum chamber 51 is inserted through a nozzle insertion hole 522 formed at the upper end of the vacuum chamber (a seal ring is mounted onto the nozzle insertion hole so that the nozzle can be inserted through the seal ring in a close contact manner) into an casting port 15 of the metal mold 14, the pressure in the vacuum chamber 51 is reduced by means of evacuation (evacuation is started automatically if the metal mold enters the vacuum chamber), and under such reduced pressure a valve 523 of the nozzle 521 is opened to thereby cast the material of the mixing kiln 52 into the metal mold.

When the casting of the material into the metal mold is completed, then the evacuation in the vacuum chamber 51 is stopped, the door of the vacuum chamber is opened, in FIG. 2(i a), the material casted metal mold is moved from within the vacuum chamber 51 to the traverser 34, a predetermined sandwich type heating device is selected from a group of sandwich type heating devices $a_1, a_2, \ldots$ in accordance with a control program, the metal mold is moved to and between the two heating plates of the selected sandwich type heating device by computer controlling the traverser 34, and the two heating plates are brought into contact with the metal mold to thereby harden the material primarily. In the primary hardening, preferably, a pressurizing hose is connected with the material casting port of the metal mold so that the material can be hardened while pressurizing the upper surface of the casted material with a pressurizing gas such as pressurizing air or the like.

In the device of FIG. 2(a), according to the time controlling of the time chart shown in FIG. 2(b), after completion of the primary hardening, the metal mold is allowed to escape from the sandwich type heating device, the metal mold is then transferred through the main rail 31 and auxiliary rail 35 to the resin releasing and mold assembling station 4 by means of computer control of the traverser 34, in which station the material or resin is released from the metal mold and the resin-released metal mold is re-assembled again (that is, the conductor connecting metal member and bolt insertion hole metal member are set), the assembled metal mold is then transferred to the traverser, and the metal mold is then moved into the vacuum chamber 51.

The metal mold, which is assembled after the resin/product is released, remains still at sufficiently high temperatures, that is, remains still in the preheated condition and, therefore, normally, such metal mold requires no preheating treatment. However, when a preheating treatment is necessary, a predetermined sandwich type heating device is selected out of a plurality of sandwich type heating devices $a_1, a_2 \ldots$ in accordance with a control program, the metal mold is transferred to and between the two plates of the selected sandwich type heating device by the computer controlling of the traverser to preheat the metal mold, and the preheated metal mold is moved into the vacuum chamber 51.

In FIG. 2(a), 53 designates a secondary hardening furnace and 54 stands for a conveyor, respectively. That is, the primarily hardened product released from the metal mold is delivered into the secondary hardening furnace 53, in which the primarily hardened product is hardened secondarily. After completion of the secondary hardening treatment, the secondarily hardened product is finished, for example, burred and is then inspected before it is shipped.

Figure 5A:
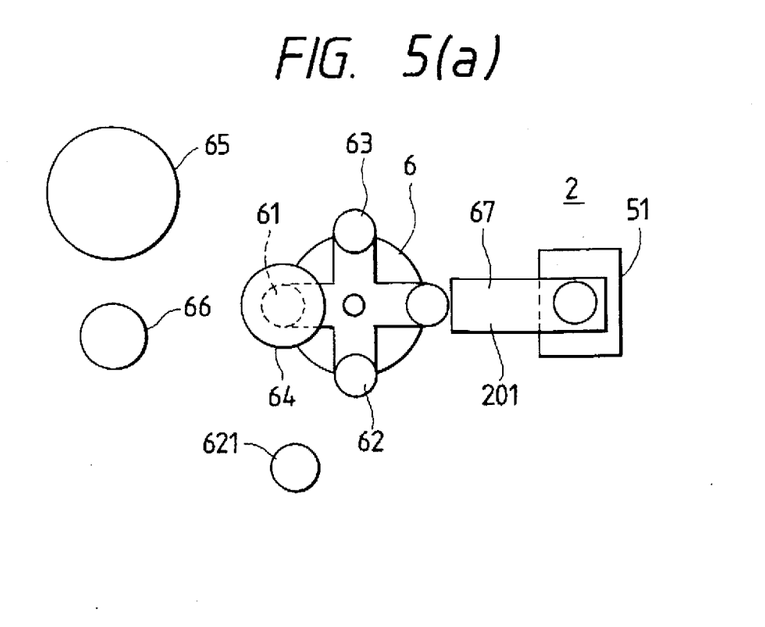
FIG. 5(a) is a plan view of a machine in an casting step to be used in the invention.
Figure 5B:
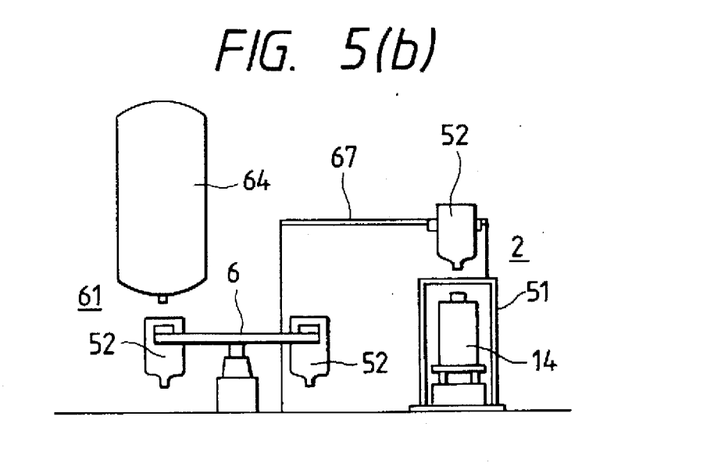
FIG. 5(b) is a side view of the above machine.

According to the invention, for casting of the material, there can be used such a machine as shown in FIG. 5(a) (a plan view) and FIG. 5(b) (a side view), respectively. In FIGS. 5(a) and (b), 6 designates a turn frame which supports the mixing kiln 52 removably on the arm thereof and then transfers the mixing kiln 52 to a measuring station 61, a stirring station 62, an casting station end 201 and a cleaning station 63 sequentially.

64 designates a mixing resin storage tank into which a predetermined amount of hardenable resin, for example, epoxy resin heated and fused by a resin mixer 65 is supplied by means of a pump (not shown) and also into which a predetermined amount of filler, for example, alumina, silica or the like stored in a filler tank 66 is supplied by means of a pneumatic pipe (not shown) using hot air while heating the filler almost up to the same temperature as the above-mentioned fused resin. The mixing resin storage tank 64 keeps on mixing the fused resin and filler together by use of a stirring blade. 2 stands for the previously described casting station, there is provided the vacuum chamber 51 in the neighborhood of the above-mentioned casting station end 201, and there is provided a crane 67 between the vacuum chamber 51 and casting station end 201.

Figure 6:
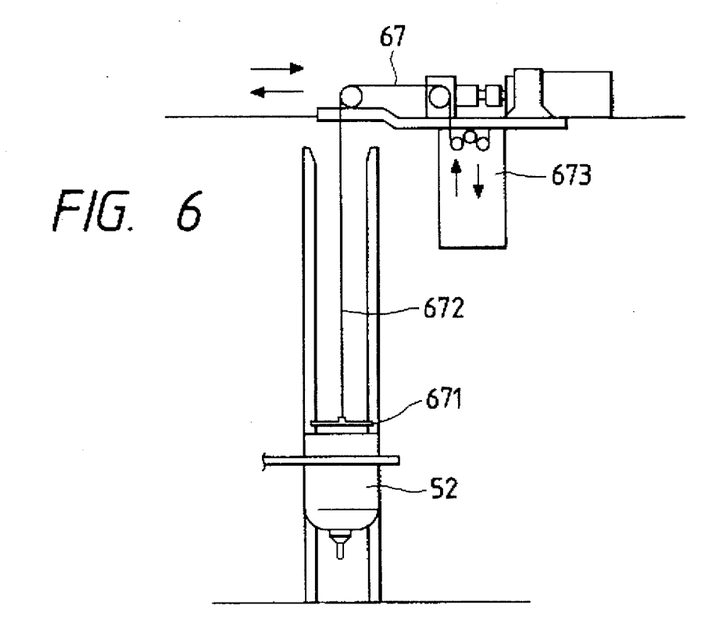
FIG. 6 is an explanatory view of a crane shown in FIG. 5.

This crane 67, as shown in FIG. 6, includes a suspension wire 672 which suspends a hatch 671. The hatch 671 is connected to the mixing kiln 52 situated in the casting station end 201 by means of an electromagnetic chuck or the like, the mixing kiln 52 is lifted by pulling up the suspension line 672, and then a crane carrier 673 is travelled horizontally to thereby transfer the mixing kiln 52 to just above the vacuum chamber 51.

To cast the material into the metal mold by use of the machine shown in FIGS. 5 and 6, in the measuring station 61, the resin/filler mixture in the mixing resin storage tank 64 corresponding to a piece of resin molding is measured and is then supplied to the mixing kiln 52. Next, the turn frame 6 is rotated 90°, and in the stirring station 62, a predetermined amount of hardener is added from a hardener storage tank 621 to the mixing kiln and is then stirred and mixed together with the resin/filler mixture. Further, the turn frame 6 is rotated 90° and, in the casting station end 201, the hatch 671 secured to end portion of the suspension wire of the crane 67 is connected to the mixing kiln 52, the mixing kiln connected to the hatch is lifted up by pulling up the suspension wire, and the crane carrier 673 is travelled horizontally to thereby position the mixing kiln at a position just above the vacuum chamber 51. The mixing kiln 52 includes an evacuation opening. Thus, just above the vacuum chamber 51, the evacuation opening is automatically coupled to an evacuation hose (not shown), so that the pressure within the mixing kiln can be reduced.

Within the vacuum chamber 51, there has already been stored the above-mentioned preheated metal mold 14 (the preheat temperature of the metal mold 14 is almost equal to the temperature of the fused resin) and, as shown in FIG. 4, the material stored in the mixing kiln 52 is poured or casted into the metal mold 14.

On completion of casting of the material into the metal mold 14, the evacuation within the vacuum chamber 51 is stopped, the door of the vacuum chamber 51 is opened, the metal mold 14 is transferred to a predetermined sandwich type heating device for hardening of the material. Also, the emptied mixing kiln 52 is returned back to the casting station by travelling the crane carrier horizontally as well as by operating the crane suspension wire, the hatch is removed from the mixing kiln, the mixing kiln is transferred to the cleaning station by rotating the turn frame 90° and the mixing kiln is cleaned there, on completion of such cleaning, and the mixing kiln is moved to the measuring station. From now on, the measuring of the resin/filler mixture corresponding to a piece of resin molding, mixing of the hardener, casting of the material into the metal mold, and cleaning are executed repeatedly.

According to the above-mentioned material casting method, there can be made constant the time that extends from addition of the material to casting of the resin composition into the metal mold, and there can also be made constant the degree of progress of hardening of the resin composition until the resin composition is casted into the metal mold, so that the hardener mixed resin can be casted into the respective metal molds in the same viscosity state.

In the casting device shown in FIG. 5, although not shown, two mixed resin storage tanks 64 may be provided; that is, when changing the compositions of the resin, the compositions of the resin to be changed can be previously mixed in one mixed resin storage tank and the other mixed resin storage tank, which is currently in use, can be replaced with the one mixed resin storage tank.

Figure 7:
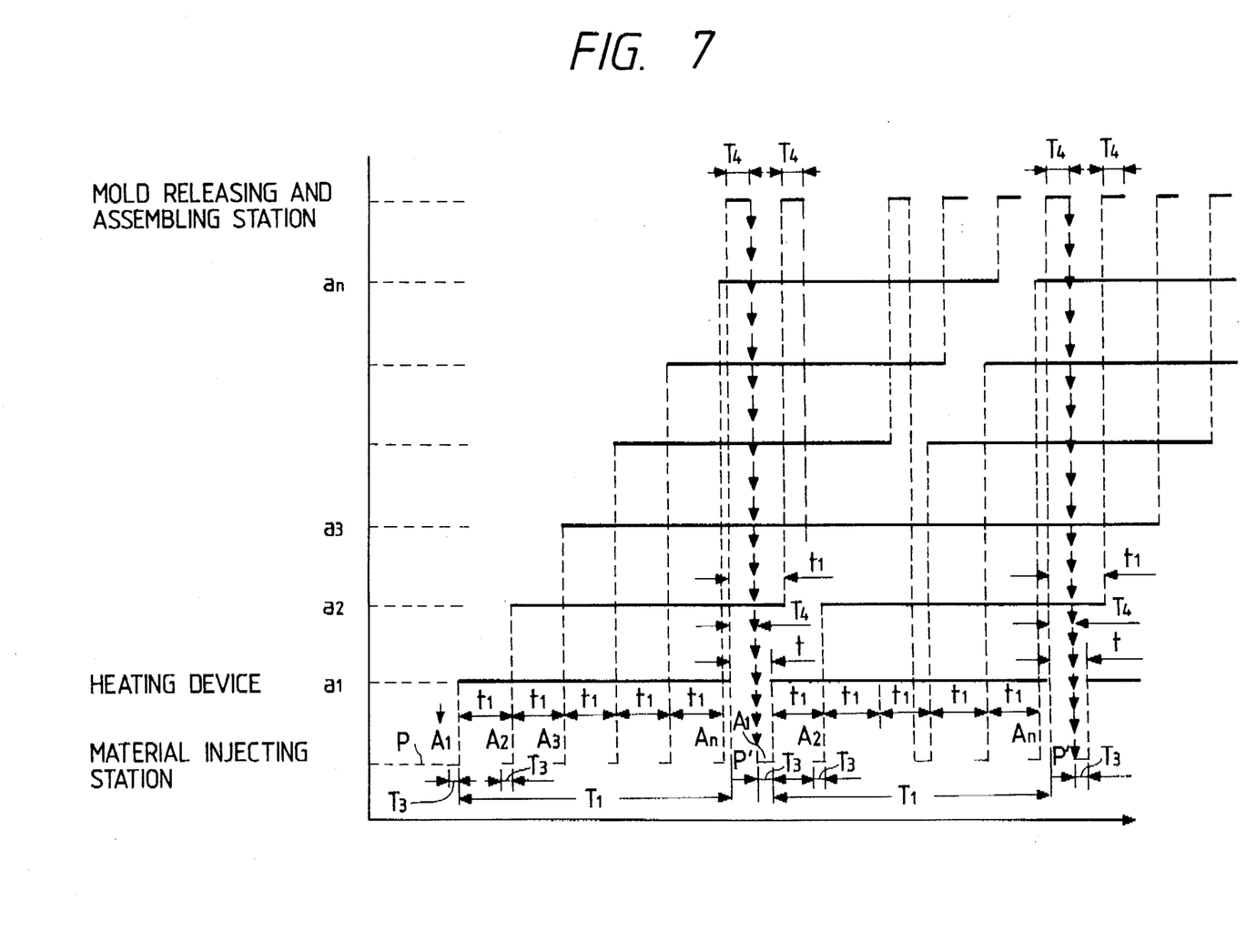
FIG. 7 is a time chart which shows the other moving states of a metal mold when the resin molding is casted according to the invention by use of the manufacturing apparatus shown in FIG. 2(a).

In addition, the primary hardening condition can be controlled according to the present invention, so that the moldings differing in the primary hardening times from each other (moldings respectively differing in the resin composition, size or shape from each other) may be produced by computer controlling in one flow or in one cycle. As shown in one example drawn in FIG. 7, in the case where the metal mold $A_3$ is much different from another metal molds in the sizes and shapes of the metal molds, the moldings can be produced in one flow or in one cycle by controlling the heating time $T_1$ of metal mold $A_3$. That is, in the present invention, even a plurality of metal molds and a plurality of heating devices are used, the moldings differing in the primary hardening time from each other can be produced by computer controlling in one flow or in one cycle.

In the above-mentioned embodiment, as the heating device, the sandwich type of heating device is used. However, the invention is not limited to this, but other kinds of heating devices can also be used. For example, the metal mold may be arranged such that is contains an electric heater therein, and a conduction power source for the electric heater may be used in place of the sandwich type of heating device.

As has been described heretofore, according to the casting method for forming a resin molding in accordance with the invention, a plurality of metal molds can be circulated at a given time difference corresponding to the number of heating devices provided in the order of a step of casting a hardenable resin composition into a preheating metal mold, a step of heating and hardening the casted material (hardenable resin), and a step of releasing the hardened product/material from the metal mold and assembling metal mold. Also, the time that extends from the material casting to the heating of the metal mold for hardening can be identical in the respective metal molds and, by casting the hardener mixed resin into the respective metal molds at the same viscosity state, it is possible to eliminate variations in the segregated states of fillers between the metal molds, to completely prevent variations in quality between the products or moldings, and to stabilize the quality of the resin moldings to a high degree.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. A casting method, for forming a resin molding in which a plurality of forming metal molds are circulated with a predetermined time lag therebetween, comprising the steps of:

casting a hardenable resin composition into a preheated forming metal mold to form a casted resin composition;

heating and hardening the casted resin composition for a predetermined time period to form a hardened product; and releasing the hardened product form the metal mold and assembling the metal mold, wherein there are provided a plurality of heating devices having heating rates which are varied in accordance with characteristics of the hardenable resin composition, and while one forming mold employed in said hardening step is being heated by one of said heating devices for said predetermined time period the other forming molds employed in said hardening step are sequentially heated for said predetermined time period by the other of said heating devices with said predetermined time lag therebetween.

2. A casting method for forming a resin molding according to claim 1, wherein said plurality of heating devices are each formed as a sandwich.

3. A method for manufacturing a resin molding, comprising the steps of:
(a) casting a filler packed resin material mixed with a hardener into a forming metal mold at a material casting station to form a casted resin material;
(b) primarily hardening the casted resin material by heating the forming metal mold for a predetermined time period to form a primarily hardened resin;
(c) releasing the primarily hardened resin from the forming metal mold;
(d) secondarily hardening the primarily hardened and released resin; and
(e) returning the metal mold to the material casting station thereby completing the manufacturing of said resin molding, said casting of said resin material into said forming metal mold further comprising the steps of measuring a resin composition corresponding to said resin molding; mixing said resin composition which has been measured with a predetermined amount of hardener to form a mixture; and casting said mixture into said forming metal mold, wherein said steps (a)–(e) are sequentially repeated using other metal molds with a predetermined time lag between each successive primarily hardening step and wherein a plurality of heating devices, having heating rates which are varied in accordance with characteristics of the casted resin material, are disposed on the side of a rail with one end portion thereof situated on said material casting station, so that while one forming metal mold is being heated by one of said heating devices, the other forming metal molds are respectively sequentially heated for said predetermined time period by the other of said heating devices thereby achieving the heating of said forming metal mold for said primarily hardening step, and wherein said release of said primarily hardened resin from said metal mold is executed in another end portion of said rail, said rail being used to return said forming metal mold to said casting station.

4. A casting method for forming a resin molding according to claim 1, wherein said plurality of forming metal molds are supported in a vertical direction during all steps.

5. A casting method for forming a resin molding according to claim 2, wherein said plurality of forming metal molds are supported in a vertical direction during all steps.

6. A manufacturing method for forming a resin molding according to claim 3, wherein said plurality of forming metal molds are supported in a vertical direction during all steps.

7. A casting method for forming a resin molding according to claim 1, the period of time extending from completion of casting of said hardenable resin to heating of the metal mold for hardening is made uniform in all of the metal molds.

8. A casting method for forming a resin molding according to claim 2, the period of time extending from completion of casting of said hardenable resin to heating of the metal mold for hardening is made uniform in all of the metal molds.

9. A manufacturing method for forming a resin molding according to claim 3, the period of time extending from completion of casting of said resin material to heating of the metal mold for hardening is made uniform in all of the metal molds.

10. A casting method for forming a resin molding in which a plurality of forming metal molds are circulated with a predetermined time lag therebetween, comprising the steps of:

- casting a hardenable resin composition into a preheated forming metal mold to form a casted resin composition;
- heating and hardening the casted resin composition for a predetermined time period to form a hardened product;
- releasing the hardened product from the metal mold and assembling the metal mold,
- wherein there are provided a plurality of heating devices having heating rates which are varied in accordance with characteristics of the hardenable resin composition, and while one forming mold employed in said hardening step is being heated by one of said heating devices for said predetermined time period the other forming molds employed in said hardening step are sequentially heated for said predetermined time period by the other of said heating devices with said predetermined time lag therebetween; and
- supplying said hardenable resin, said supplying step comprising the steps of:
- providing a rotary frame rotatably movable through a measuring station, a material casting station and a cleaning station sequentially in this order; and
- providing a vessel removably supported by the rotary frame;
- wherein said measuring station includes means for measuring and casting a main material consisting of a mixture of a resin and a filler into said vessel,
- wherein said hardener stirring station includes means for casting a predetermined amount of hardener into said main material casting vessel and mixing said main material with said hardener so as to form said hardenable resin, and
- wherein said material casting station includes means for removing from said rotary frame said vessel containing therein said hardenable resin, casting said hardenable resin contained in said removed vessel into a forming metal mold, and, after completion of said casting, returning said vessel to said rotary frame so that said vessel can be supported by said rotary frame.

* * * * *